US010315704B2

(12) United States Patent
Kiyoshita et al.

(10) Patent No.: US 10,315,704 B2
(45) Date of Patent: *Jun. 11, 2019

(54) SIDE VEHICLE-BODY STRUCTURE OF VEHICLE

(71) Applicant: MAZDA MOTOR CORPORATION, Hiroshima (JP)

(72) Inventors: Daisuke Kiyoshita, Hiroshima (JP); Shuji Muraoka, Iwakuni (JP); Yuki Yamachika, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/801,065

(22) Filed: Nov. 1, 2017

(65) Prior Publication Data

US 2018/0244319 A1 Aug. 30, 2018

(30) Foreign Application Priority Data

Feb. 24, 2017 (JP) ................................ 2017-033881

(51) Int. Cl.

| | |
|---|---|
| ***B62D 25/08*** | (2006.01) |
| ***B62D 21/15*** | (2006.01) |
| ***B62D 25/02*** | (2006.01) |
| ***B62D 25/04*** | (2006.01) |
| ***B62D 27/02*** | (2006.01) |

(52) U.S. Cl.

CPC ......... *B62D 25/088* (2013.01); *B62D 21/152* (2013.01); *B62D 25/02* (2013.01); *B62D 25/04* (2013.01); *B62D 27/02* (2013.01)

(58) Field of Classification Search

CPC .... B62D 25/088; B62D 21/152; B62D 25/02; B62D 25/04

USPC .............................. 296/198, 187.11, 187.12

See application file for complete search history.

(56) References Cited

U.S. PATENT DOCUMENTS

| | | | | |
|---|---|---|---|---|
| 2016/0023685 A1* | 1/2016 | Fujii | .................... | B62D 25/087 280/124.154 |
| 2016/0272250 A1 | 9/2016 | Yokoi | | |
| 2016/0297481 A1* | 10/2016 | Yokoi | .................. | B62D 25/087 |
| 2018/0244318 A1* | 8/2018 | Kiyoshita | ............ | B62D 21/157 |
| 2018/0273108 A1* | 9/2018 | Masuda | ............... | B62D 25/088 |
| 2018/0273110 A1* | 9/2018 | Masuda | ............... | B62D 25/088 |

FOREIGN PATENT DOCUMENTS

| | | |
|---|---|---|
| JP | 2006-103435 A | 4/2006 |
| JP | 2015-101298 A | 6/2015 |
| WO | 2015/040672 A1 | 3/2015 |

* cited by examiner

*Primary Examiner* — Jason S Morrow

(74) *Attorney, Agent, or Firm* — Studebaker & Brackett PC

(57) ABSTRACT

A rear frame, a roof side rail, a rear wheelhouse, a C pillar, and a rear suspension housing reinforcement which interconnects the C pillar and the rear wheelhouse are provided. Herein, the rear suspension housing reinforcement has a cutout portion which is configured to extend obliquely rearward and upward at a rear lower end portion thereof, the cutout portion being not connected to the rear wheelhouse.

6 Claims, 9 Drawing Sheets

12 A 2 1 4 6 73 64 10 14 16 18 B B 72 71 70 P1 31 79 A L1 P2 22 26 20 L2 48 8 Upward Rearward Forward Downward 1
2
4
10
64
72
70
71
31
8
48
A
B
12
73
A
79
26
20
22
L1
P1
P2
L2
B
6
16
14
18
Forward
Upward
Downward
Rearward 1
20
26
26a
30
31
40
41
42
44
45
46
47
48
49
51
52
53
54
Upward
Forward
Rightward
Leftward
Rearward
Downward 2
S1
4
64
60
61
99
99a
99b
88
121
83
63
61a
62a
85
89
90
122
71
C
100
C
62
Upward
32
Outward
Inward
56
30
Downward
22
26
20

SIDE VEHICLE-BODY STRUCTURE OF VEHICLE

BACKGROUND OF THE INVENTION

The present invention relates to a side vehicle-body structure of a vehicle.

A side vehicle-body structure of a vehicle in which a rear pillar extending in a vertical direction at a rear edge portion of a door opening portion and a rear wheelhouse are interconnected by a reinforcing member is known. Japanese Patent Laid-Open publication No. 2006-103435 discloses a side vehicle-body structure of a vehicle which comprises a rear-side pillar extending in the vertical direction between a rear wheelhouse and a roof, a rear pillar extending in the vertical direction at a rear edge portion of a door, and a reinforcing member extending in a longitudinal direction between the rear-side pillar and the rear pillar.

The reinforcing member disclosed in the above-described patent document is configured to have a downward-opening cross section for the purpose of being easily deformable when receiving a collision load in a vehicle rear collision. The reinforcing member is deformed longitudinally compressively in the rear collision so as to absorb the collision load, so that the collision load transmitted to the rear pillar is decreased.

According to the structure of the above-described patent document, since the reinforcing member is deformed in the longitudinal direction by receiving the collision load in the rear collision, a riding (boarding) space positioned in back of the rear pillar is easily decreased in the longitudinal direction.

Meanwhile, it may be considered that decreasing of the riding space in the rear collision is suppressed by configuring the reinforcing member such that its deformation is suppressed by improving its rigidity. In this case, however, the collision load transmitted to the rear pillar is so increased that that the rear pillar may have the excessive deformation.

SUMMARY OF THE INVENTION

The present invention has been devised in view of the above-described problem, and an object of the present invention to provide a side vehicle-body structure of a vehicle which can properly decrease the collision load transmitted to the rear pillar, suppressing the above-described decreasing of the riding space positioned in back of the rear pillar.

The present invention is a side vehicle-body structure of a vehicle, comprising a rear frame extending in a longitudinal direction at a rear lower portion of a vehicle body, a roof side rail extending in the longitudinal direction at an upper side portion of the vehicle body, a rear wheelhouse positioned on an outward side, in a vehicle width direction, of the rear frame and covering over a rear wheel, a rear pillar extending downward from the roof side rail at a rear edge portion of an door opening portion which is positioned adjacently in front of the rear wheelhouse, and a suspension housing reinforcement interconnecting the rear pillar and the rear wheelhouse, wherein the rear suspension housing reinforcement has a cutout portion which is configured to extend obliquely rearward and upward at a rear lower end portion thereof, the cutout portion being not connected to the rear wheelhouse.

According to the present invention, since the rear lower end portion of the suspension housing reinforcement is not joined to the rear wheelhouse, it is avoided that deformation of the rear wheelhouse in the rear collision is blocked by the rear lower end portion of the suspension housing reinforcement. That is, a portion of the rear wheelhouse which is positioned in back of and below the cutout portion can be a crushable zone which is deformed in the vehicle rear collision, thereby absorbing the collision load properly.

Further, since the cutout portion extends obliquely rearward and upward, the cutout portion and the crushable zone of the rear wheelhouse are provided to overlap each other in the longitudinal direction. Consequently, improvement of the rigidity is attained by configuring the suspension housing reinforcement to be properly great both in the longitudinal direction and in the vertical direction, and also the crushable zone of the rear wheelhouse is configured to be properly great in the longitudinal direction by its overlapping with the suspension housing reinforcement. In other words, supporting of the rear wheelhouse at the suspension housing reinforcement and absorbing of collision energy by the rear wheelhouse can be attained compatibly at a high level.

Moreover, in a case where the rear lower end portion of the suspension housing reinforcement is connected to the rear wheelhouse, deformation of the rear wheelhouse is suppressed by the suspension housing reinforcement in the rear collision. Meanwhile, the collision load is excessively transmitted to the rear pillar, so that there is a concern that the rear pillar may have excessive deformation. In contrast, since the rear lower end portion of the suspension housing reinforcement is not connected to the rear wheelhouse according to the present invention, the collision load is properly transmitted to the rear pillar.

Accordingly, the collision load (energy) of the rear collision is properly absorbed and decreased by the rear wheelhouse, properly supported at the suspension housing reinforcement having the improved rigidity, and properly transmitted to the rear pillar. Thus, the collision load transmitted to the rear pillar can be properly decreased, suppressing the decreasing of the riding space positioned in back of the rear pillar.

In an embodiment of the present invention, in a vehicle-body side view, a main frame which extends in the longitudinal direction is connected to a front end portion of the rear frame, a curve portion which curves rearward and upward is provided between the rear frame and the main frame, and a first imaginary line which is defined as an imaginary line which is formed by extending the cutout portion of the suspension housing reinforcement is configured to pass through the curve portion.

According to this embodiment, since the curve portion which is configured to curve upward is provided between the rear frame and the main frame, the rear frame is easily deformed such that it rotates forward and upward with the curve portion as a base point in the rear collision. In this case, the rear wheelhouse is deformed such that it is compressed in an upward-oblique direction from its rear lower end portion toward a forward side. In contrast, since this embodiment is configured such that the first imaginary line which is defined as the imaginary line which is formed by extending the cutout portion of the suspension housing reinforcement passes through the curve portion, deformation of a portion of the rear wheelhouse which is positioned in back of and below the first imaginary line can be attained effectively, whereas deformation of a portion of the rear wheelhouse which is positioned in front of and above the first imaginary line can be suppressed.

Accordingly, the suspension housing reinforcement can be made to perform efficiently as a rigidity member such that the rear wheelhouse is divided into its crushable zone and its deformation-suppression portion which are positioned vertically (longitudinally) relatively to the first imaginary line.

In another embodiment of the present invention, in a vehicle-body side view, the cutout portion of the suspension housing reinforcement is configured to substantially perpendicular to a second imaginary line which is defined as an imaginary line which is formed by interconnecting a rear end portion of the suspension housing reinforcement and a rear lower-side portion of the rear wheelhouse.

According to this embodiment, the cutout portion of the suspension housing reinforcement is configured to substantially perpendicular to the longest portion in the crushable zone of the rear wheelhouse (an area which interconnects the rear end portion of the suspension housing reinforcement and the rear lower-side portion of the rear wheelhouse). That is, the crushable zone can be made longer in a direction which extends obliquely forward and upward (a direction which rotates forward and upward with a front end portion of the rear frame as a base point in the rear collision), and also the suspension housing reinforcement can be made to be efficiently arranged adjacently to the crushable zone.

In another embodiment of the present invention, the rear wheelhouse comprises a suspension top portion to which an upper end portion of a suspension is attached, and at least a portion of the suspension housing reinforcement which overlaps the suspension top portion in a vehicle-body side view is connected to the rear wheelhouse.

According to this embodiment, the load inputted from the suspension can be supported properly.

Other features, aspects, and advantages of the present invention will become apparent from the following description which refers to the accompanying drawings.

DETAILED DESCRIPTION OF THE INVENTION

Hereafter, a side vehicle-body structure of a vehicle according to an embodiment of the present invention will be described referring to the accompanying drawings. In each figure of the accompanying drawings, while one side (right side), in a vehicle-body width direction, of a vehicle-body structure is illustrated mainly, the other side (left side) of the vehicle-body structure is configured similarly. Further, in each figure of the accompanying drawings, directions of rearward/rearward, inward/outward (or leftward/rightward), and upward/downward sides show a vehicle-body longitudinal direction, a vehicle-body width direction, and a vehicle-body vertical direction, respectively.

[Whole Structure]

Figure 1:
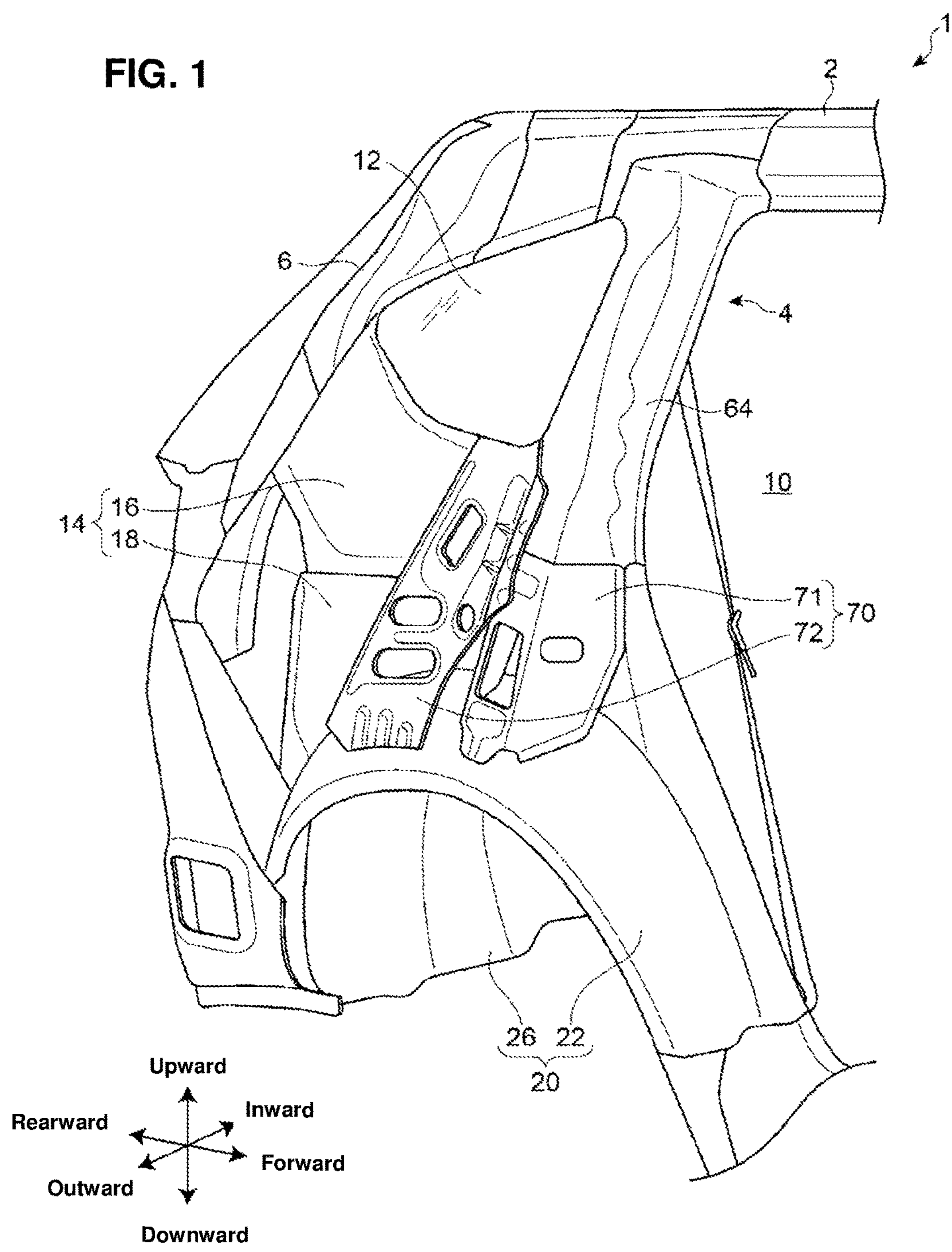
FIG. 1 is a perspective view of a vehicle-body rear portion of an automotive vehicle which is provided with a side vehicle-body structure of a vehicle according to an embodiment of the present invention, when viewed from an outside of a cabin.
Figure 2:
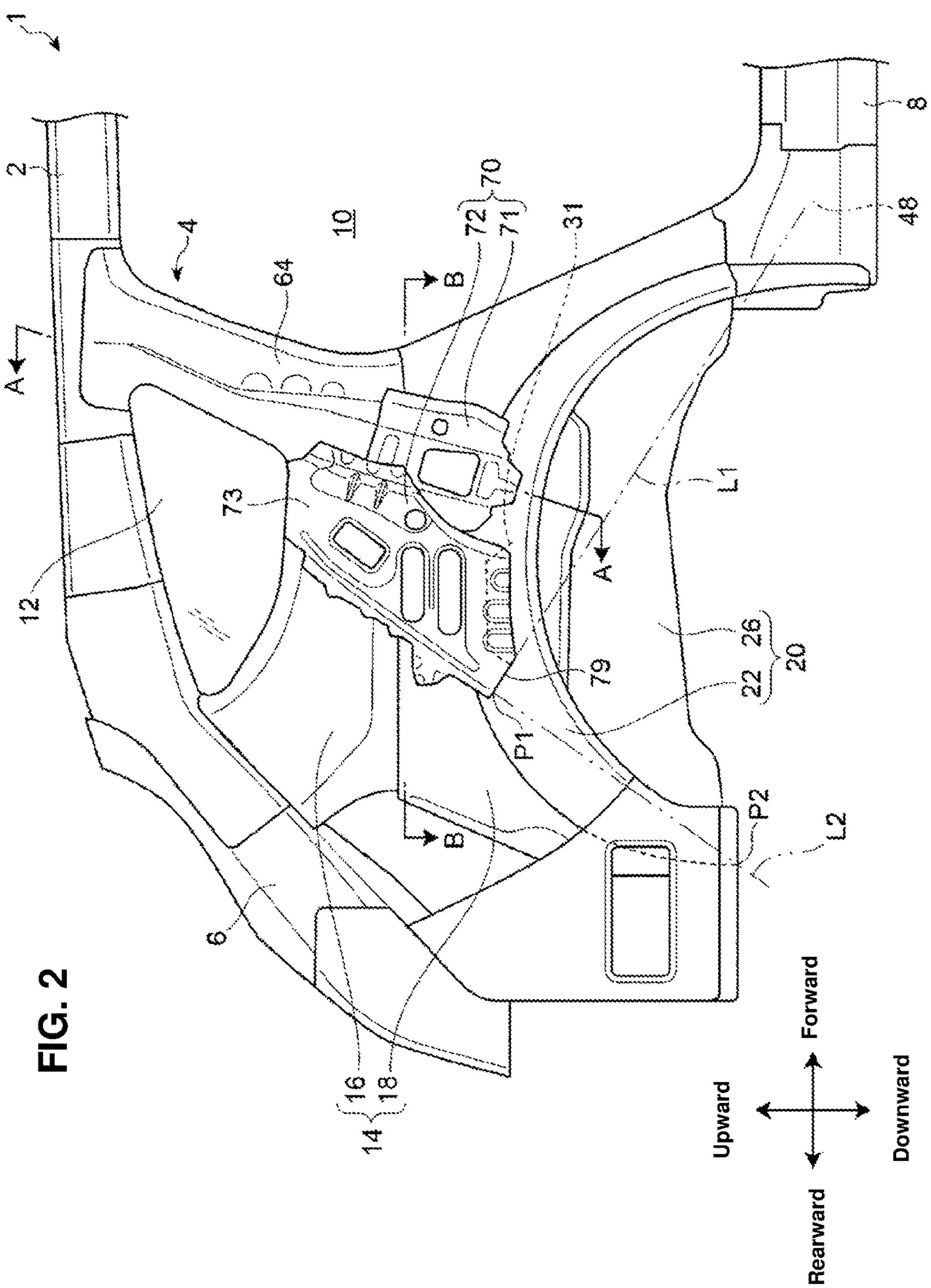
FIG. 2 is a side view of the vehicle-body rear portion, when viewed from the outside of the cabin.
Figure 3:
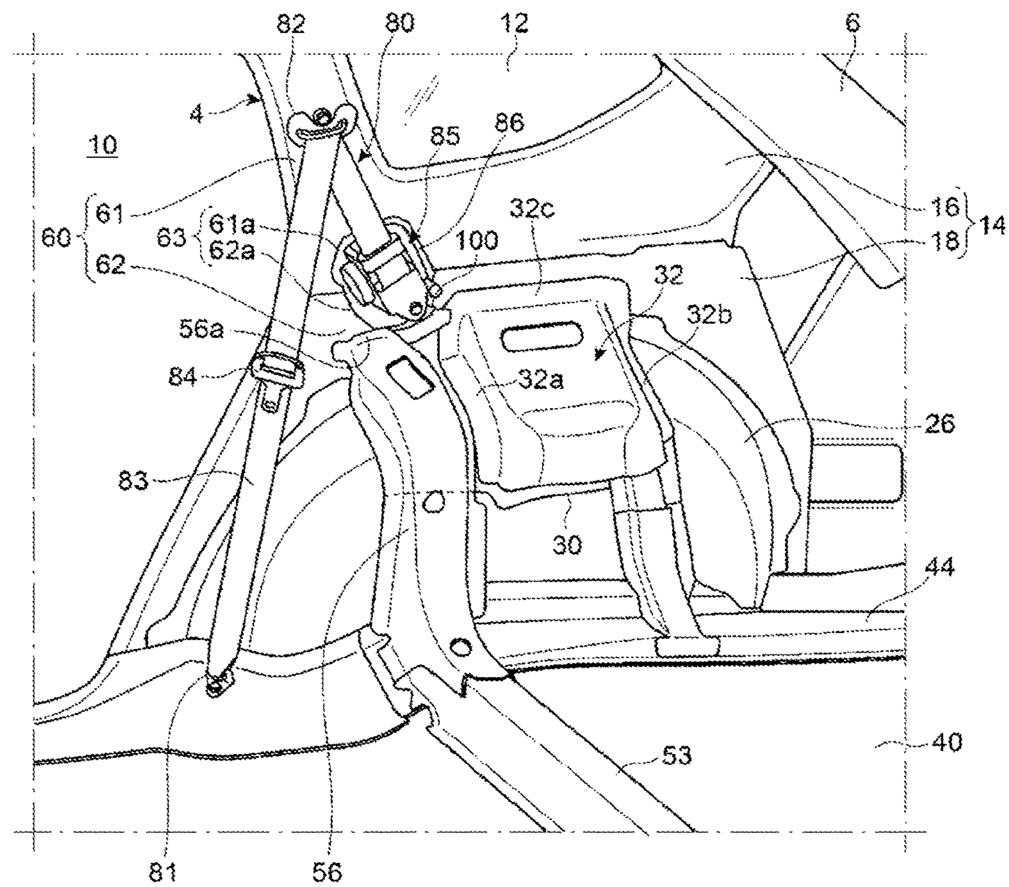
FIG. 3 is a side view of the vehicle-body rear portion, when viewed from an inside of the cabin.
Figure 3:
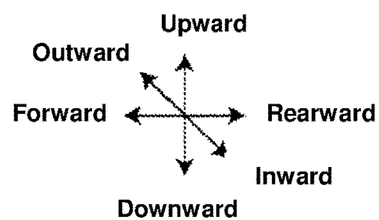

As shown in FIGS. 1-3, an automotive vehicle 1 which is provided with the side vehicle-body structure of the vehicle according to the present embodiment comprises a pair of right-and-left roof side rails 2 which extend in the vehicle-body longitudinal direction along outward end portions, in the vehicle-body width direction, of a roof panel (not illustrated) and plural pillar portions which extend in the vehicle-body vertical direction from the roof side rails 2 toward a vehicle-body downward side.

The plural pillar portions comprise an A pillar (front pillar) and a B pillar (center pillar), which are not illustrated, and a C pillar (quarter pillar) 4 and a D pillar (rear-side pillar) 6, which are shown in FIGS. 1-3. The A pillar, the B pillar, the C pillar 4, and the D pillar 6 are arranged, in the vehicle-body longitudinal direction, in order from a forward side at intervals.

The automotive vehicle 1 is a so-called three-row seat vehicle, in which seats are not illustrated. A front-door opening portion for a first-row seat (not illustrated) is provided between the A pillar and the B pillar, a rear-door opening portion for a second-row seat 10 is provided between the B pillar and the C pillar 4, and a quarter window for a third-row seat 12 is provided between the C pillar 4 and the D pillar 6. That is, the B pillar is positioned at a rear edge portion of the front-door opening portion, the C pillar 4 is positioned at a rear edge portion of the rear-door opening portion 10, and the D pillar 6 is positioned at a rear end portion of a vehicle body.

The automotive vehicle 1 comprises a side panel 14 which forms a side portion of the vehicle body on a vehicle-body rearward side from the rear-door opening portion 10 and a rear wheelhouse 20 which covers over a rear wheel. The rear wheelhouse 20 is provided along a lower edge of the side panel 14. Front lower end portions of the side panel 14 and the rear wheelhouse 20 are connected to a rear end portion of a side sill 8 which extends in the vehicle-body longitudinal direction.

The side panel 14 comprises an upper panel 16 and a lower panel 18 which are provided continuously in the vehicle-body vertical direction. A lower end portion of the upper panel 16 and an upper end portion of the lower panel 18 are joined together by welding, for example.

The rear wheelhouse 20 comprises a wheelhouse outer 22 (see FIGS. 1 and 2) which protrudes outward, in the vehicle-body width direction, from the side panel 14 and a wheelhouse inner 26 (see FIGS. 3 and 4) which protrudes inward, in the vehicle-body width direction, from the side panel 14. Herein, illustrations of the wheelhouse outer 22 and the side panel 14 (see FIGS. 1 and 2) are omitted in FIG. 4, and the wheelhouse inner 26 is shown such that its cabin-outside face is illustrated.

The wheelhouse outer 22 is formed integrally with the lower panel 18 of the side panel 14, and the wheelhouse inner 26 is joined to a cabin-side face of the lower panel 18 by welding, for example.

Figure 4:
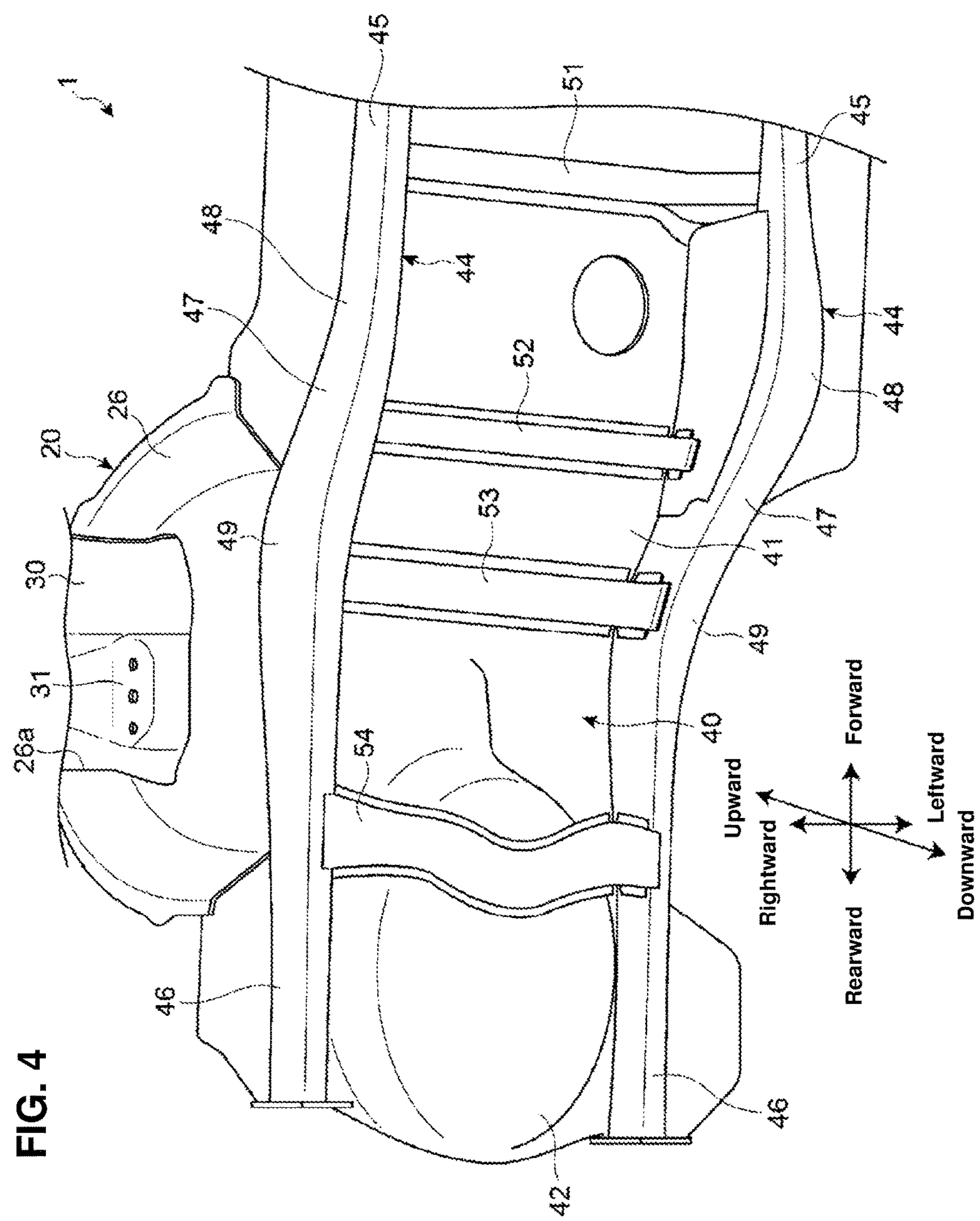
FIG. 4 is a side view of a bottom face portion and its surrounding portion of the vehicle-body rear portion, when viewed from a vehicle-body downward side.

As shown in FIG. 4, a cutout 26*a* is formed at an upper portion of the wheelhouse inner 26, and a suspension housing 30 is joined to the wheelhouse inner 26 such that it covers over the cutout portion 26*a* from a vehicle-body upward side. A suspension top portion 31 where an upper end portion of a suspension member for a rear wheel (not illustrated) is provided at a rearward-side portion of the suspension housing 30. The suspension top portion 31 is formed as a flat face portion which is configured to extend roughly horizontally and have an oval shape with a long length in the longitudinal direction in a plan view, and the upper end portion of the suspension member for the rear wheel is fixedly fastened to a lower face of the suspension top portion 31 at two longitudinal points.

Further, as shown in FIG. 3, a suspension housing gusset 32 is joined to the upper portion of the wheelhouse inner 26 via the suspension housing 30. More specifically, the suspension housing gusset 32 is located at a position which corresponds to the suspension top portion 31, that is, the suspension housing gusset 32 is joined to a rearward-side portion of the suspension housing 30. At a peripheral edge portion of the suspension housing gusset 32 are provided a pair of front-and-rear flange portions 32*a*, 32*b* which are joined to the wheelhouse inner 26 or the suspending housing gusset 32 and a flange portion 32*c* which is joined to the cabin-side face of the lower panel 18 of the side panel 14. That is, the suspension housing gusset 32 is provided across the wheelhouse inner 26 (the rearward-side portion of the suspension housing 30) and the side panel 14.

A side brace 56 is arranged adjacently in front of the side housing gusset 32. The side brace 56 is a connecting member which connects a cross member 53, which will be described, to the side of the C pillar 4.

The side brace 56 is a long member which has a hat-shaped cross section opening downward or outward. The side brace 56 is arranged such that its outward-side portion is positioned upward, compared to its inward-side portion. The side brace 56 is joined to the cross member 53 at an inward end portion, in the vehicle-body width direction, thereof, and joined to a cabin-side face of the side panel 14 (lower panel 18) at an outward end portion, in the vehicle-width direction, thereof. The side brace 56 is also joined, by welding, for example, to the wheelhouse inner 26 and a forward-side portion of the suspension housing 30 at an intermediate-side portion, in the vehicle-body width direction, thereof which is located between the inward end portion and the outward end portion.

Figure 7:
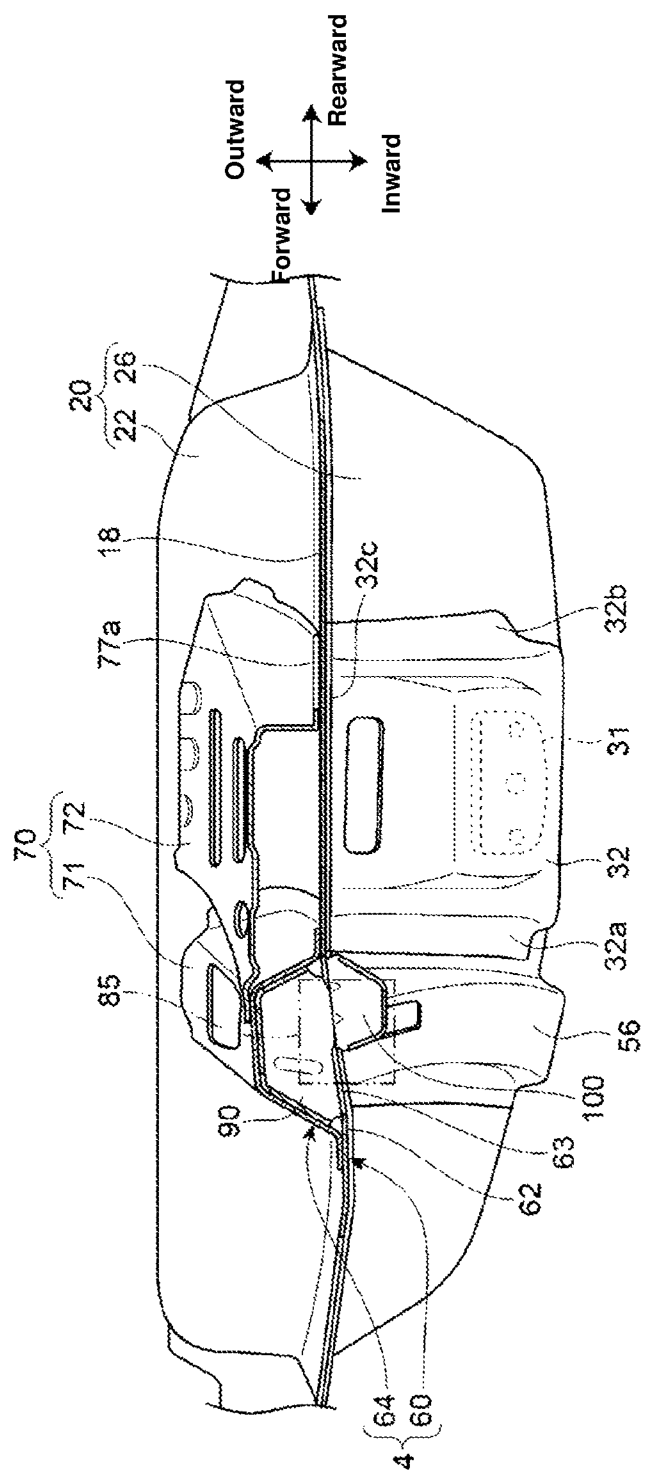
FIG. 7 is a sectional view of the C pillar and its surrounding portion, taken along line B-B of FIG. 2, when viewed from a vehicle-body upward side.

Additionally referring to FIG. 7, the suspension housing gusset 32 and the side brace 56 are joined to the upper portion of the suspension housing 30 over a vehicle-body longitudinal range.

As shown in FIGS. 3 and 4, a vehicle-body rear portion of the automotive vehicle 1 is provided width a floor panel 40 which constitutes a floor face of the cabin where the second-row seat and the third-row seat are arranged, a pair of right-and-left side frames 44 which extend in the vehicle-body longitudinal direction along both side portions of the floor panel 40, and plural cross members 51, 52, 53, 54 which are provided along the floor panel 40 between the right-and-left side frames 44.

The floor panel 40 has a step portion 41 for layout of the third-row seat which is arranged at a higher level position than the second-row seat. The side frame 44 comprises a main frame 45 which extends roughly horizontally in the vehicle-body longitudinal direction on the inward side, in the vehicle-body width direction, of the side sill 8 (FIG. 2) and a rear frame 46 which extends in the vehicle-body longitudinal direction at a rear lower portion of the vehicle body continuously from a rear end portion of the main frame 45. The rear frame 46 is arranged at a position which substantially corresponds to the third-row seat in the vehicle-body side view, and the wheelhouse inner 26 is joined, by welding, for example, to an outward side face of the rear frame 46 such that the wheelhouse inner 26 protrudes outward continuously from the outward side face of the rear frame 46. Further, a tire pan 42 which protrudes downward is provided at a portion of the floor panel 40 which is positioned in back of the step portion 41.

A kick-up portion 47 is provided at a front end portion of the rear frame 46 which corresponds to the step portion 41 of the floor panel 40. The kick-up portion 47 is provided to extend obliquely rearward and upward. The side frame 44 has curve portions 48, 49 at a front end portion and a rear end portion of the kick-up portion 47. The front-side curve portion 48 is arranged in front of the rear wheelhouse 30, and the rear-side curve portion 49 is arranged in back of a front end of the rear wheelhouse 20. The front-side curve portion 48 is positioned between the main frame 45 and the rear frame 46.

The plural cross members 51, 52, 53, 54 are provided, in the vehicle-body longitudinal direction, at a position which is located in front of the front-side curve portion 48, at a position which is located between the front-side and rear-side curve portions 48, 49, at a position which overlaps the rear-side curve portion 49, and a position which is located in back of the rear-side curve portion 49, respectively. The cross members 51, 52, 53, 54 are provided to extend in the vehicle-body width direction.

As shown in FIG. 3, the automotive vehicle 1 is provided with a seatbelt device 80 for each seat. The seatbelt device 80 shown in FIG. 3 is a three-point seatbelt device for the second-row seat.

The seatbelt device 80 comprises an anchor 81 which is fixed to the side frame 44, for example, a through anchor 82 which is fixed to the C pillar 4, a belt (webbing) 83 which is inserted into the through anchor 82 and fixed to the anchor 81 at its one end portion, a tongue plate 84 which is attached to the belt 83 so as to slide between the anchor 81 and the through anchor 82, a buckle (not illustrated) which is provided on the seat so as to be engaged with the tongue plate 84, and a retractor (seatbelt retractor) 85 which winds the belt 83 from its other-end side.

The retractor 85 is an emergency-lock type retractor (ELR) which is configured to lock the belt when detecting the vehicle collision based on an inclination of the vehicle body, deceleration of the vehicle, a belt's drawing-out speed, and the like, for example. The retractor 85 is equipped with a pre-tensioner 86. The retractor 85 is arranged inside the C pillar 4 at a position which is located below the through anchor 82.

[C Pillar]

Figure 5:
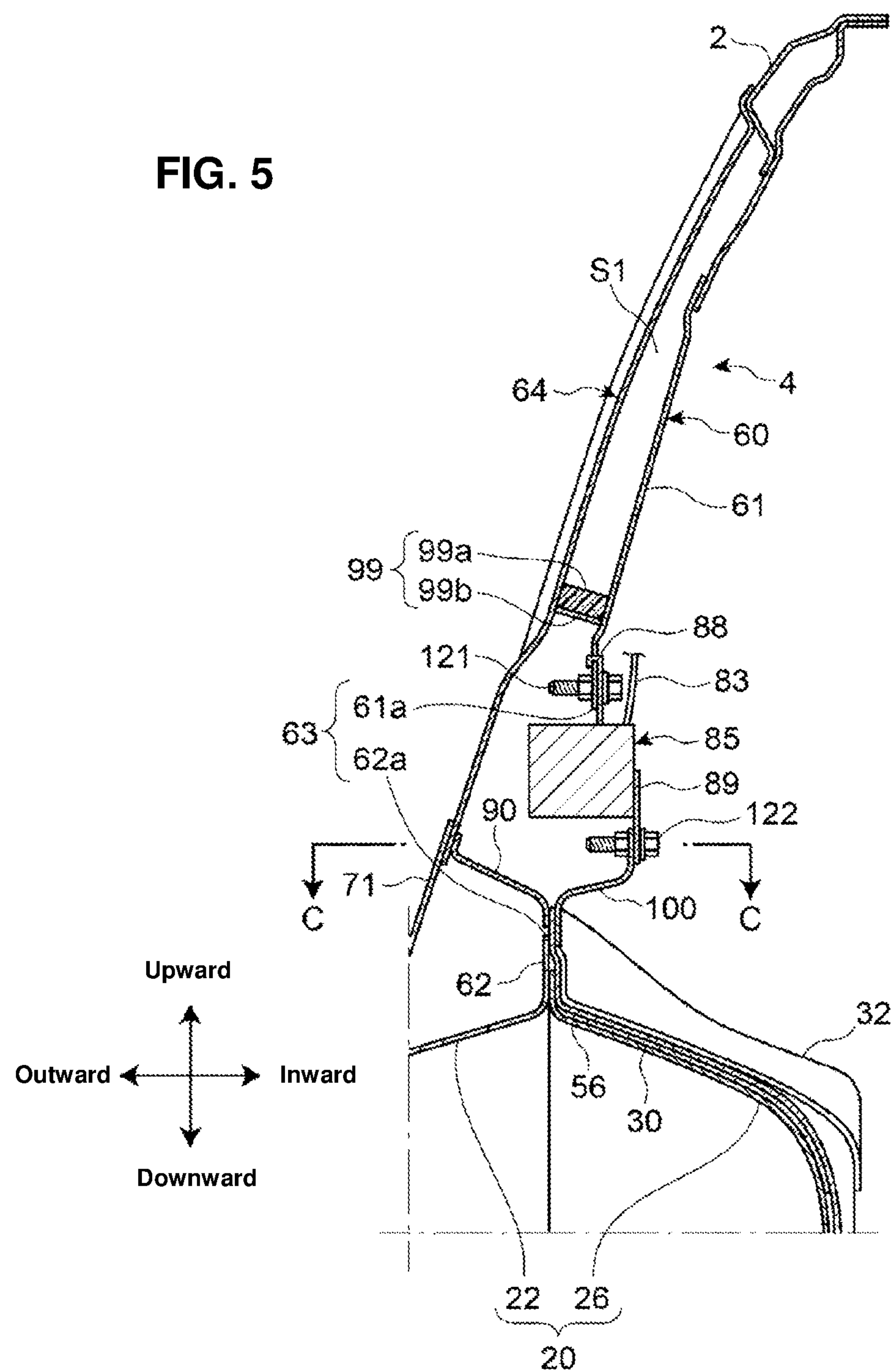
FIG. 5 is a sectional view of a C pillar and its surrounding portion, taken along line A-A of FIG. 2, when viewed from a vehicle-body forward side.

As shown in FIG. 5, the C pillar 4 comprises a pillar inner 60 which forms a cabin-side face of the C pillar and a pillar outer 64 which is joined to a cabin-outward side of the pillar inner 60. The C pillar 4 is configured to have a closed cross section which extends in the vehicle-body vertical direction, which is formed by the pillar inner 60 and the pillar outer 64.

The pillar inner 60 comprises a pillar inner upper 61 and a pillar inner lower 62 which is continuous to a vehicle-body lower side of the pillar inner upper 61.

As shown in FIG. 3, the pillar inner upper 61 is provided integrally with the upper pane 16 of the side panel 14. The pillar inner upper 61 is configured as a belt-shaped portion which extends in the vehicle-body vertical direction at a front end portion of the upper panel 16, and it has a cutout 61*a* at its lower end portion. The pillar inner lower 62 is configured by a portion of the lower panel 18 of the side panel 14, and it has a cutout 62*a* at its upper end portion.

A position of the cutout 61*a* of the pillar inner upper 61 and a position of the cutout 62*a* of the pillar inner lower 62 are matched in the vehicle-body longitudinal direction. Thereby, the pillar inner 60 has a roughly rectangular-shaped opening portion 63 which is formed by the cutouts 61*a*, 62*a*.

As shown in FIGS. 2 and 5, the pillar outer 64 is a long member which extends in the vehicle-body vertical direction along a cabin-outside face of the pillar inner 60. An upper end portion of the pillar outer 64 is joined to the roof side rail 2 by welding, for example, and a lower end of the pillar outer 64 is spaced upward apart from the rear wheelhouse 20.

Figure 9:
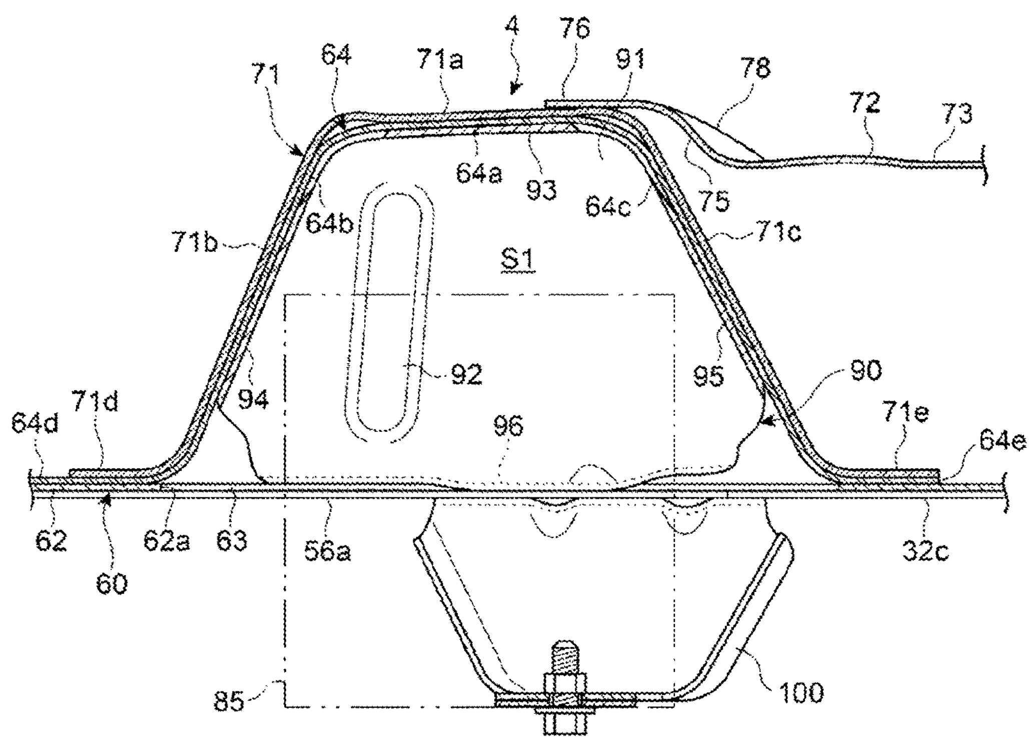
FIG. 9 is a sectional view of an anchor bracket, the knot member, and its surrounding portion, taken along line C-C of FIG. 2, when viewed from the vehicle-body upward side.
Figure 9:
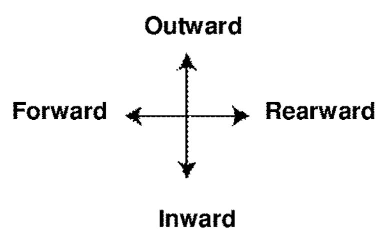

As shown in FIG. 9, the pillar outer 64 is configured to have a hat-shaped cross section opening inward in the vehicle-body width direction. The pillar outer 64 comprises a side face portion 64*a* which faces an outward side, in the vehicle-body width direction, of the pillar inner 60, a front face portion 64*b* which extends inward from a forward-side edge portion of the side face portion 64*a*, a rear face portion 64*c* which extends inward from a rearward-side edge portion of the side face portion 64*a*, a front flange portion 64*d* which extends forward from an inward-side edge portion of the front face portion 64*b*, and a rear flange portion 64*e* which extends rearward from an inward-side edge portion of the rear face portion 64*c*.

The pillar outer 64 is joined to a cabin-outside face of the pillar inner 60 by welding, for example, at its front flange portion 64*d* and its rear flange portion 64*e*. The front flange portion 64*d* and the rear flange portion 64*e* of the pillar outer 64 are joined to the pillar inner upper 61 mainly, and the pillar outer 64 is joined to the pillar inner lower 62 at its lower end portion.

That is, as shown in FIG. 5, the C pillar 4 is configured to have a closed cross section which extends in the vertical direction from the roof side rail 2 to a position which is spaced upward apart from the rear wheelhouse 20. A soundproof member 99 and a knot member 90 are arranged in a space S1 formed inside the C pillar 4 such that these members are spaced apart from each other in the vehicle-body vertical direction as a partitioning member which partitions the space S1 in the vehicle-body vertical direction. The soundproof member 99 is arranged at a position which is located above the opening portion 63 (see FIG. 3) of the pillar inner 60, and the knot member 90 is arranged at a position which is located below the opening portion 63.

The soundproof member 99 comprises a sound absorbing material 99*a* which absorbs noises or vibrations and a supporting material 99*b* which supports the sound absorbing material 99*a*. The sound absorbing material 99*a* is foamed resin, for example. The supporting material 99*b* is attached such that it is provided between the pillar inner upper 61 and the pillar outer 64.

The knot member 90 is a plate-shaped reinforcing member which is arranged inside the C pillar 4 for suppressing sectional deformation of the C pillar 4. A specific structure of the knot member 90 will be described later.

Figure 6:
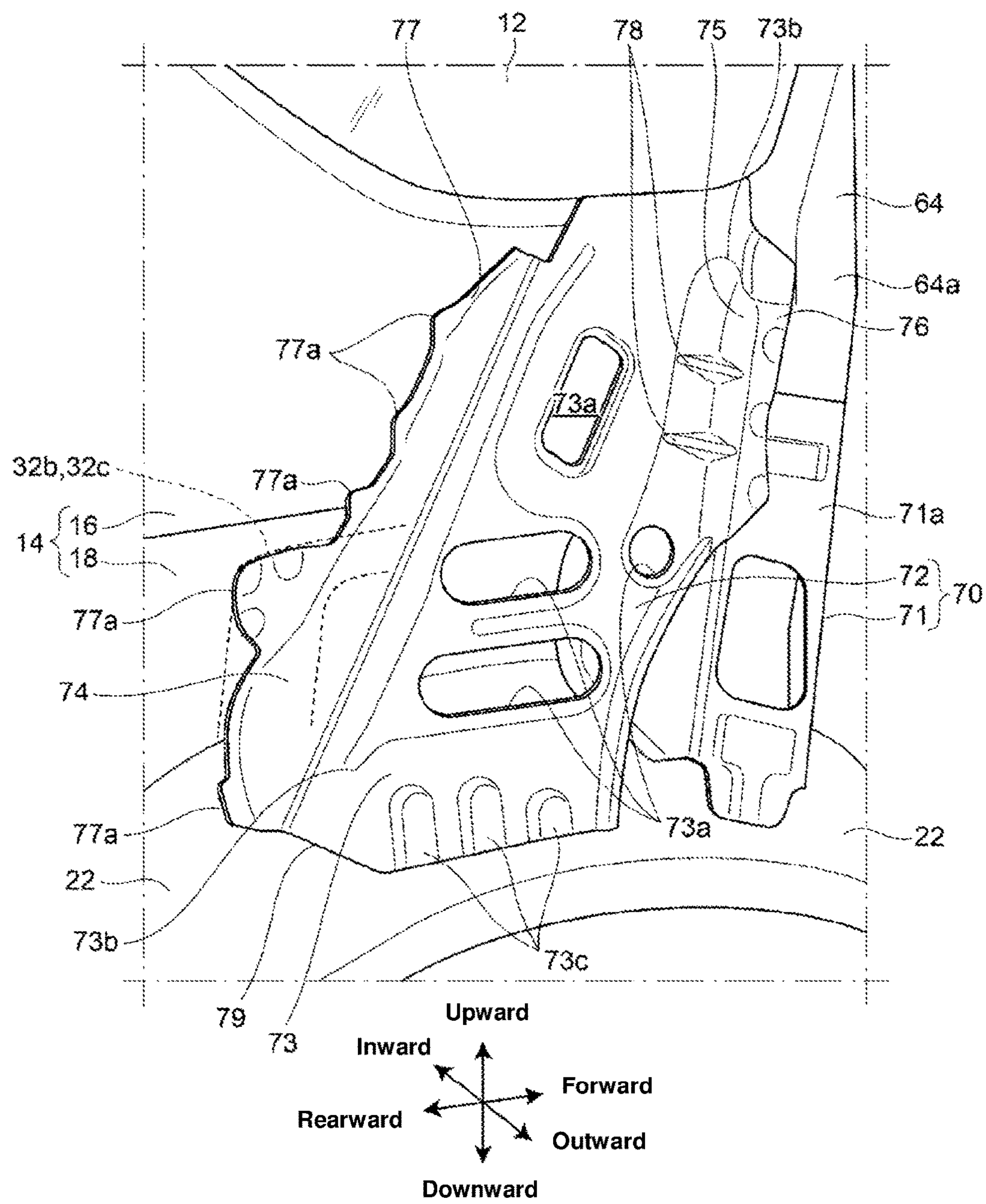
FIG. 6 is a perspective view of the C pillar and its surrounding portion, when viewed from the outside of the cabin.

As shown in FIG. 6, a suspension housing reinforcement 70 is arranged between the C pillar 4 and an upper face portion of the wheelhouse outer 22 such that the suspension housing reinforcement 70 connects these portions in the vertical direction. The suspension housing reinforcement 70 is formed in a fork shape such that a front suspension housing reinforcement 71 and a rear suspension housing reinforcement 72 which is positioned in back of the front suspension housing reinforcement 71 fork in the vehicle-body longitudinal direction.

The front suspension housing reinforcement 71 extends downward from a lower end portion of the pillar outer 64 to an upper face portion of the wheelhouse outer 22 along an extension direction of the lower end portion of the pillar outer 64, and its upper end portion and its lower end portion are joined, by welding, for example, to a lower end portion of the pillar outer 64 and an upper face portion of the wheelhouse outer 22, respectively.

As shown in FIG. 9, the front suspension housing reinforcement 71 has a hat-shaped cross section opening inward. The front suspension housing reinforcement 71 comprises a side face portion 71*a* which faces the outward side, in the vehicle-body width direction, of the pillar inner 60, a front face portion 71*b* which extends inward from a forward-side edge portion of the side face portion 71*a*, a rear face portion 71*c* which extends inward from a rearward-side edge portion of the side face portion 71*a*, a front flange portion 71*d* which extends forward from an inward-side edge portion of the front face portion 71*b*, and a rear flange portion 71*e* which extends rearward from an inward-side edge portion of the rear face portion 71*c*.

The front suspension housing reinforcement 71 is joined to a cabin-outside face of the pillar inner lower 62 of the pillar inner 60 by welding, for example, at its front flange portion 71*d* and its rear flange portion 71*e*. The front flange portion 71*d* and the rear flange portion 71*e* of the front suspension housing reinforcement 71 are directly joined to the pillar inner lower 62 mainly, and the front suspension housing reinforcement 71 is joined to the pillar inner lower 62 via the flange portions 64*d*, 64*e* of the pillar outer 64 at its upper end portion.

The side face portion 71*a*, the front face portion 71*b*, and the rear face portion 71*c* of the front suspension housing reinforcement 71 are joined, by welding, for example, to respective outsides of the side face portion 64*a*, the front face portion 64*b*, and the rear face portion 64*c* of the lower end portion of the pillar outer 64 at an upper end portion of the front suspension housing reinforcement 71.

Further, as shown in FIGS. 1 and 6, the front flange portion 71*d* and the rear flange portion 71*e* of the front suspension housing reinforcement 71 curve outward and are joined, by welding, for example, to an upper face portion of the wheelhouse outer 22 at a lower end portion of the front suspension housing reinforcement 71.

As shown in FIG. 6, the rear suspension housing reinforcement 72 extends obliquely downward and rearward at a position located in back of the front suspension housing reinforcement 71 such that a rear portion of the C pillar 4 (pillar outer 64) and a rear portion of the front suspension housing reinforcement 71 are connected to an upper face portion of the wheelhouse outer 22 in a bracing shape. The rear suspension housing reinforcement 72 comprises a side face portion 73 which faces the outward side, in the vehicle-body width direction, of the side panel 14 and a rear face portion 74 which extends inward from a rear edge portion of the side face portion 73, which is configured to have an L-shaped cross section.

The side face portion 73 extends obliquely downward and rearward from an upper end portion thereof which is arranged substantially in the same-surface shape with a lower edge portion of the quarter window 12 to an upper face portion of the wheelhouse outer 22. The side face portion 73 is joined, by spot welding, to the upper panel 16 and the wheelhouse outer 22 at its upper end portion and its lower end portion, respectively.

As shown in FIG. 2, a cutout portion 79 is formed at a rear lower end portion of the side face portion 73. This cutout portion 79 is configured to extend obliquely upward and rearward. Accordingly, the side face portion 73 is joined to the wheelhouse outer 22 at its lower end portion, except the cutout portion 79. The cutout portion 79 is not joined to the wheelhouse outer 22.

More specifically, a first imaginary line L1 which is formed by extending the cutout portion 79 extends obliquely forward and downward in the vehicle-body side view, and passes through the curve portion 48 which is positioned in front of the kick-up portion 47 of the side frame 44. Further, the first imaginary line L1 is substantially perpendicular to a second imaginary line L2 which connects an imaginary point P1 which is positioned at a rearmost end portion of the side face portion 73 (which is positioned on the side of the rearmost face portion 74 among points on the cutout portion 79) and an imaginary point P2 which is positioned at a rear lower-side portion of the rear wheelhouse 20 (wheelhouse outer 22), preferably positioned at a rear end portion and a lower end portion of the rear wheelhouse 20. Herein, the second imaginary line L2 extends obliquely forward and upward, which is substantially parallel to an extension direction of the side face portion 73. Further, the rear lower-side portion of the rear wheelhouse 20 means a portion of a rear side portion of the rear wheelhouse 20 which is positioned at a roughly lower half side of the rear wheelhouse 20 as shown by a broken line in FIG. 2.

Further, a portion of the lower end portion of the side face portion 73 which is joined to the wheelhouse outer 22 is positioned so as to overlap the suspension top 31 in the vehicle-body side view. In other words, the cutout portion 79 is formed at a position which is located in back of the suspension top portion 31 in the vehicle-body directional direction.

As shown in FIG. 6, plural opening portions 73*a* are formed at the side face portion 73. The plural opening portions 73*a* are formed, considering the weight reduction of the rear suspension housing reinforcement 72 and the workability of assembling respective members (inserting a spot-welding gun, jig, or the like, for example). A bead portion 73*b* is formed around the opening portions 73*a* so as to reinforce an opening edge portion of the opening portions 73*a*.

Moreover, bead portions 73*c* which protrude outward, in the vehicle-body width direction, of the vehicle are formed at the portion of the lower end portion of the side face portion 73 which is joined to the wheel house outer 22, excluding the portion spot-welded. A lower edge portion of the side face portion 73 is reinforced by the bead portions 73*c*. Further, since the lower edge portion of the side face portion 73 is partially joined to the wheel house outer 22 by the bead portion 73*c*, the lower edge portion of the side face portion 73 can be easily set along the wheel house outer 22.

The rear suspension housing reinforcement 72 further comprises a front flange portion 76 which is joined to a vehicle-body forward side of the side face portion 73 by spot welding such that the rear suspension housing reinforcement 72 is positioned over the pillar outer 64 and the side face portions 64*a*, 71*a* of the front suspension housing reinforcement 71.

Herein, the pillar outer 64 and the front suspension housing reinforcement 71 are configured such that the side face portions 64*a*, 71*a* are positioned on the outward side, in the vehicle-body width direction, of the quarter window 12. Accordingly, there is a positional difference in the vehicle-body width direction between the side face portion 73 of the rear suspension hosing reinforcement 72 and the side face portions 64*a*, 71*a* of the pillar outer 64 and the front suspension housing reinforcement 71. Specifically, the side face portion 73 of the rear suspension housing reinforcement 72 is positioned on the inward side, in the vehicle-body width direction, of the pillar outer 64 and the side face portions 64*a*, 71*a* of the front suspension housing reinforcement 71.

Therefore, the front flange portion 76 is positioned on the outward side, in the vehicle width direction, of the side face portion 73 via a step face portion 75 for settling the positional difference, in the vehicle-body width direction, between the side face portion 73 and the side face portions 64*a*, 71*a*. Two high-rigidity portions 78 which extend in the vehicle-body longitudinal direction are formed at vertically-spaced points between the side face portion 73 and the step face portion 75.

Referring to FIG. 9 additionally, the high-rigidity portion 78 is configured as a so-called triangular rib which protrudes in a triangular shape in a corner portion between the side face portion 73 and the step face portion 75 in a plan view. The rigidity, in the vehicle-body width direction, of the front flange portion 76 is so increased by the high-rigidity portion 78 that the rigidity of a joint portion between the rear suspension housing reinforcement 72 and the pillar outer 64 and the front suspension housing reinforcement 71 can be increased.

The front flange portion 76 is configured such that its spot-welding portions are recessed inward in the vehicle-body width direction and positioned along the pillar outer 64 and the side face portions 64*a*, 71*a* of the front suspension housing reinforcement 71.

The rear suspension housing reinforcement 72 has a rear flange portion 77 which extends rearward from an inward-side edge portion, in the vehicle-body width direction, of the rear face portion 74. The rear flange portion 77 extends in the vehicle-body vertical direction along an outer surface of the side panel 14, and its lower end portion curves outward so as to be positioned along the upper face portion of the wheel house outer 22. The rear flange portion 77 has plural expanded flange portions 77*a* which are configured to be partially expanded rearward.

The rear flange portion 77 is joined, by spot welding, for example, to the side panel 14 and the wheel house inner 26 at the plural expanded flange portions 77*a*. Specifically, the plural expanded flange portions 77*a* are provided such that the two expanded flange portions 77*a* are formed at the joint portions to the upper panel 16, the single expanded flange portion 77*a* is formed at the joint portion to the intermediate portion located between the upper panel 16 and the lower panel 18, the single expanded flange portion 77*a* is formed at the joint portion to the lower panel 18, and the single expanded flange portion 77*a* is formed at the joint portion to the wheel house outer 22.

The expanded flange portion 77*a* which is positioned at the joint portion to the lower panel 18 is configured to be wider than the other expanded flange portions 77*a* such that it faces the rear flange portion 32*b* of the suspension housing gusset 32 which is positioned on the inward side of the lower panel 18 or the upper flange portion 32*c*. This expanded flange portion 77*a* and the flange portions 32*b*, 32*c* of the suspension housing gusset 32 are joined to each other by spot welding at plural points in a three-layer state where the lower panel 18 is interposed between these portions.

Referring to FIG. 7 additionally, the front suspension housing reinforcement 71 is provided to face the side brace 56 such that the lower panel 18 is interposed between the front suspension housing reinforcement 71 and the side brace 56. That is, a forward-side portion of the rear wheel house 20 where the suspension housing 30 is provided is supported by the side brace 56 and the front suspension housing reinforcement 71 which are arranged on both sides, in the vehicle-body width direction, of the lower panel 18, and a rearward-side portion of the rear wheel house 20 where the suspension housing 30 is provided is supported by the suspension housing gusset 32 and the rear suspension housing reinforcement 72 which are arranged on the both sides, in the vehicle-body width direction, of the long panel 18.

Accordingly, the suspension housing 30 is firmly supported by the suspension gusset 32, the side brace 56, the front suspension housing reinforcement 71, and the rear suspension housing reinforcement 72 over a range of the vehicle-body longitudinal direction.

A load inputted to the suspension housing 30 from the suspension member through the suspension top portion 31 is efficiently transmitted to the rear suspension housing reinforcement 72 from the expanded flange portions 77*a* by way of the suspension housing gusset 32. Further, since the joint portion where the rear suspension housing reinforcement 72 and the wheelhouse outer 22 are joined overlaps the suspension top portion 31 in the vehicle-body side view as described above, the load input from the suspension member is more efficiently transmitted from the suspension top portion 31 by the rear suspension housing reinforcement 72.

[Knot Member]

Figure 8A:
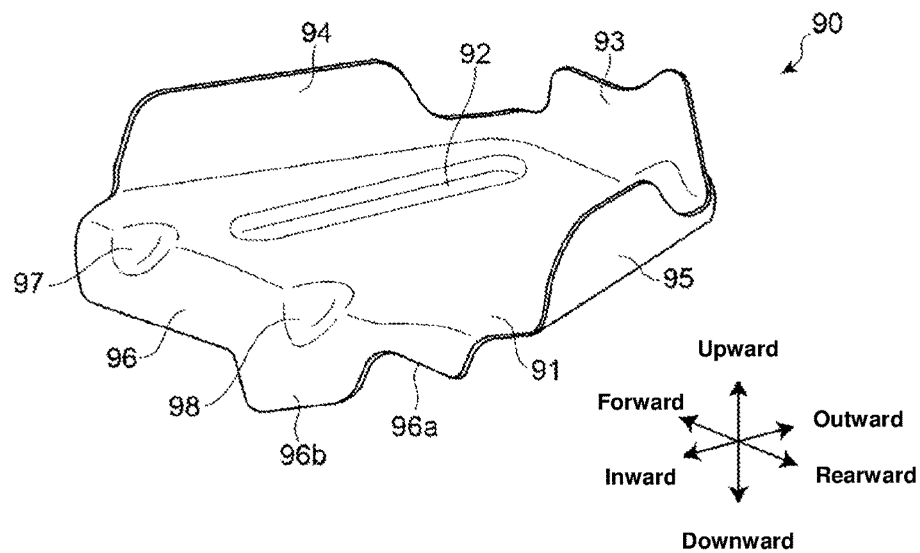
FIGS. 8A, 8B are perspective views of a knot member for reinforcing the C pillar.
Figure 8B:
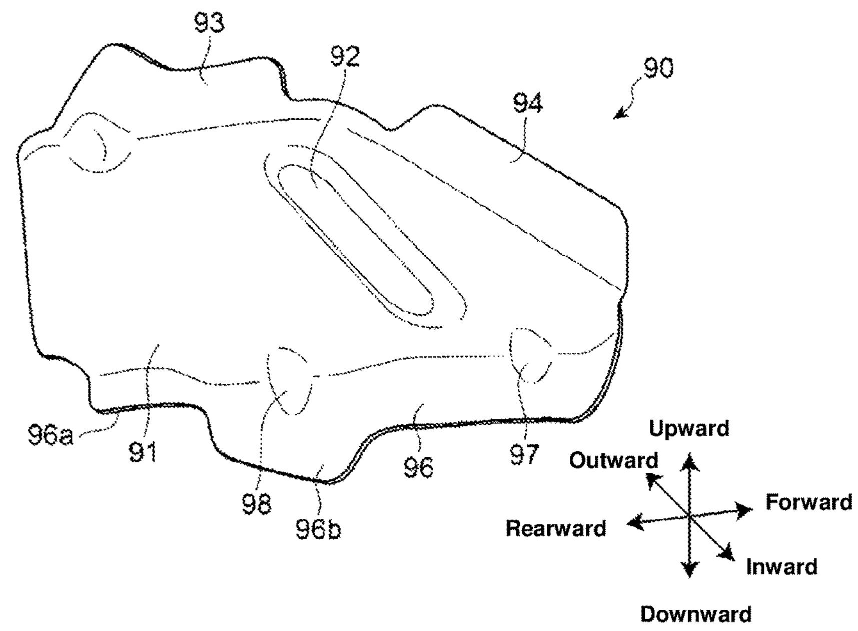

Referring to the perspective view of the knot member 90 shown in FIGS. 8A and 8B and the sectional view of the C pillar 4 shown in FIG. 9, the knot member 90 and its related structure will be described.

The knot member 90 comprises a partitioning wall portion 91 which partitions the space S1 formed inside the C pillar 4 in the vehicle-body vertical direction and plural flange portions 93, 94, 95, 96 which are provided at a peripheral edge portion of the partitioning wall portion 91.

The partitioning wall portion 91 is arranged along a face which crosses the vehicle-body vertical direction. More specifically, the partitioning wall portion 91 is arranged along the face which is roughly perpendicular to a length direction of the C pillar 4. The partitioning wall portion 91 is configured to be of a roughly trapezoidal shape so as to match the shape of the closed cross section of the C pillar 4 (see FIG. 9). An inward edge portion, in the vehicle-body width direction, of the partitioning wall portion 91 is configured to be parallel to and longer than an outward edge portion, in the vehicle-body width direction, of the partitioning wall portion 91.

A single bead 92 is formed at the portioning wall portion 91, for example. The bead 92 is configured to protrude downward in the vehicle-body vertical direction from the partition wall portion 91, for example. The bead 92 is configured to be slender such that it extends in the vehicle-body direction.

The plural flange portions 93, 94, 95, 96 of the knot member 90 comprise the outward flange portion 93 which is provided at an outward-side edge portion, in the vehicle-body width direction, of the knot member 90, the front flange portion 94 which is provided at an forward-side edge portion, in the vehicle-body direction, of the knot member 90, the rear flange portion 95 which is provided at a rearward-side edge portion, in the vehicle-body longitudinal direction, of the knot member 90, and the inward flange portion 96 which is provided at an inward-side edge portion, in the vehicle-body width direction, of the knot member 90.

The outward flange portion 93, the front flange portion 94, and the rear flange portion 95 are provided to protrude upward from the partitioning wall portion 91. The outward flange portion 93 is provided to be integrally continuous to the front flange portion 94 and the rear flange portion 95.

The inward flange portion 96 is provided to protrude downward from the partitioning wall portion 91. The inward flange portion 96 has a cutout 96*a* at its rear end portion. Further, the inward flange portion 96 includes an extension portion 96*b*, a downward-protrusion quantity of which is increased. The extension portion 96*b* is arranged in front of and adjacently to the cutout 96*a* in the vehicle-body longitudinal direction.

A pair of high-rigidity portions 97, 98, for example, are provided in a corner portion between the portioning wall portion 91 and the inward flange portion 96. The pair of high-rigidity portions 97, 98 are provided to be spaced apart from each other in the vehicle-body longitudinal direction. Each of these high-rigidity portions 97, 98 is configured to be a bead which protrudes downward, for example. Providing the high-rigidity portions 97, 98 effectively suppress bending deformation of the knot member 90 in the corner portion between the portioning wall portion 91 and the inward flange portion 96.

As shown in FIG. 9, the knot member 90 is joined to the pillar outer 64 of the C pillar 4 at the outward flange portion 93, the front flange portion 94, and the rear flange portion 95. More specifically, the outward flange portion 93, the front flange portion 94, and the rear flange portion 95 are joined to a joint portion where the lower end portion of the pillar outer 64 and the upper end of the front suspension housing reinforcement 71 are joined, for example.

The front suspension housing reinforcement 71 is provided to overlap an outside of the pillar outer 64 at the joint portion where the lower end portion of the pillar outer 64 and the upper end portion of the front suspension housing reinforcement 71 are joined, for example.

Further, the outward flange portion 93, the front flange portion 94, and the rear flange portion 95 are provided to overlap respective insides of the side face portion 64*a*, the front face portion 64*b*, and the rear face portion 64*c* of the lower end portion of the pillar outer 64, respectively, so that the flange portions 93, 94, 95 of the knot member 90, the pillar outer 64, and the front suspension housing reinforcement 71 are configured to be in a three-layer overlapping state.

The knot member 90 is fixed by welding the pillar outer 64 and the front suspension housing reinforcement 71 in the three-layer overlapping state at the outward flange portion 93, the front flange portion 94, and the rear flange portion 95.

As described above, the knot member 90 is firmly fixed to the C pillar 4 through joining to plural faces including a pair of faces of the C pillar 4 which face each other (the front face portions 64*b*, 71*b* and the rear face portions 64*c*, 71*c*). Accordingly, providing the knot member 90 as described above effectively suppresses crushing of the closed cross section of the C pillar 4.

Herein, the knot member 90 may be joined to the pillar inner lower 62 by welding, for example, at the inward flange portion 96. Specifically, a forward-side portion of the inward flange portion 96 may be joined to a peripheral edge portion of the cutout 62*a* of the pillar inner lower 62, for example.

[Support Structure of Retractor]

As shown in FIG. 5 schematically, the retractor 85 is attached to the pillar inner lower 62 by an anchor bracket 100 and arranged between the soundproof material 99 and the knot member 90 along the vehicle-body vertical direction in the inside space S1 of the C pillar 4. A part of the retractor 85 is arranged in the space S1 of the C pillar 4, and the rest part of the retractor 85 is provided to protrude toward the cabin inside through the opening portion 63 of the pillar inner 60.

As described above, a space for storing the retractor 85 is properly decreased between the C pillar 4 and a pillar trim (not illustrated) covering the C pillar 4 from the cabin inside by arranging the retractor 85 by utilizing the space S1 of the C pillar 4, compared to a case where a whole part of the retractor 85 is arranged on the cabin-inside side of the C pillar 4. Accordingly, the pillar trim can be arranged on the outward side, in the width direction, of the vehicle body, so that a living space for a passenger seated in the third-row seat can be made wider in the vehicle-body width direction.

According to the side vehicle-body structure configured as described above, the rear suspension housing reinforcement 72 has the cutout portion 79 which extends obliquely rearward and upward at the rear lower end portion. Consequently, since the rear lower end portion of the rear suspension housing reinforcement 72 is not joined to the wheelhouse outer 22, it is avoided that deformation of the rear wheelhouse 70 in the rear collision is blocked by the rear lower end portion of the suspension housing reinforcement 72. That is, a portion of the rear wheelhouse 20 which is positioned in back of and below the cutout portion 79 in the side view can be the crushable zone which is deformed in the vehicle rear collision, thereby absorbing the collision load.

Further, since the cutout portion 79 extends obliquely rearward and upward, a portion of the lower end portion of the rear suspension housing reinforcement 72 which is not joined to the wheelhouse outer 22 is provided to overlap the crushable zone of the wheelhouse outer 22 in the longitudinal direction. Consequently, improvement of the rigidity is attained by configuring the rear suspension housing reinforcement 72 to be properly great both in the longitudinal direction and in the vertical direction, and also the crushable zone of the rear wheelhouse 20 is configured to be great in the longitudinal direction by its overlapping with the rear suspension housing reinforcement 72. In other words, supporting of the wheelhouse outer 22 at the rear suspension housing reinforcement 72 and absorbing of collision energy by the rear wheelhouse 20 can be attained compatibly at a high level.

Moreover, in a case where the rear lower end portion of the rear suspension housing reinforcement 72 is connected to the wheelhouse outer 22, deformation of the rear wheelhouse 20 is suppressed by the rear suspension housing reinforcement 72 in the rear collision. Meanwhile, the collision load is excessively transmitted to the C pillar 4, so that there is a concern that the C pillar 4 may have excessive deformation. In contrast, since the rear lower end portion of the rear suspension housing reinforcement 72 is not connected to the wheelhouse outer 22 in the above-described embodiment, the collision load is properly transmitted to the C pillar 4.

Accordingly, the collision load (energy) of the rear collision is properly absorbed and decreased by the rear wheelhouse 20, properly supported at the rear suspension housing reinforcement 72 having the improved rigidity, and properly transmitted to the C pillar 4. Thus, the collision load transmitted to the C pillar 4 can be properly decreased, suppressing the decreasing of the riding space positioned in back of the C pillar 4.

Further, since the curve portion 48 which is configured to curve upward is provided between the rear frame 46 and the main frame 45 of the side frame 44, the rear frame 46 is easily deformed such that it rotates forward and upward with the curve portion 48 as a base point in the rear collision. In this case, the rear wheelhouse 20 is deformed such that it is compressed in the upward-oblique direction from its rear lower end portion toward the forward side. In contrast, since the present embedment is configured such that the first imaginary line L1 which is defined as the imaginary line which is formed by extending the cutout portion 79 of the rear suspension housing reinforcement 72 passes through the curve portion 48, deformation of the portion of the rear wheelhouse 20 which is positioned in back of and below the first imaginary line L1 can be attained effectively, whereas deformation of the portion of the rear wheelhouse 20 which is positioned in front of and above the first imaginary line L1 can be suppressed.

Accordingly, the rear suspension housing reinforcement 72 can be made to perform efficiently as a rigidity member such that the rear wheelhouse 20 is divided into its crushable zone and its deformation-suppression portion which are positioned vertically (longitudinally) relatively to the first imaginary line L1.

Moreover, the cutout portion 79 of the rear suspension housing reinforcement 72 is configured to substantially perpendicular to the longest portion in the crushable zone of the rear wheelhouse 20 (an area which interconnects the rear end portion of the rear suspension housing reinforcement 72 and the rear lower-side portion of the rear wheelhouse 20). That is, the crushable zone can be made longer in the direction which extends obliquely forward and upward (the direction which rotates forward and upward with the front end portion of the rear frame as a base point in the rear collision), and also the rear suspension housing reinforcement 72 can be made to be efficiently arranged adjacently to the crushable zone.

The second imaginary line L2 extends obliquely forward and upward, which is substantially parallel to the extension direction of the rear suspension housing reinforcement 72 (the side face portion 73). Thereby, the crushable zone of the rear wheelhouse 20 can be made longer in the extension direction of the second imaginary line L2, and also the rear suspension housing reinforcement 72 can be made to effectively perform against (resist) the deformation of the rear wheelhouse 20 which progresses along the second imaginary line L2.

Also, when the load directed forward through the rear frame 46 is inputted to the rear wheelhouse 20 in the rear collision, the suspension housing reinforcement 70 which is arranged between the wheelhouse outer 22 and the pillar outer 64 performs such that the suspension housing reinforcement 70 is stretched to the wheelhouse outer 22 and the pillar outer 64 in the vertical direction. Further, since the suspension housing reinforcement 70 is configured in the fork shape, comprising the front suspension housing reinforcement 71 and the rear suspension housing reinforcement 72, the wheelhouse outer 22 is supported from above in a wider range in the longitudinal direction. Consequently, the upward deformation of the rear wheelhouse 20 can be properly suppressed by the suspension housing reinforcement 70 in the vehicle rear collision, so that the decreasing, in the vertical direction, of the cabin space can be prevented.

Further, since the load inputted to the rear wheelhouse 20 can be transmitted and dispersed to the roof side rail 2 from the fork-shaped suspension housing reinforcement 70 by way of the C pillar 4 at the wheelhouse outer 22, the deformation of the rear wheelhouse 20 can be further suppressed.

Moreover, since the suspension housing reinforcement 70 is configured in the fork shape, comprising the front suspension housing reinforcement 71 and the rear suspension housing reinforcement 72, the increasing in size of the suspension housing reinforcement 70 can be prevented more properly compared to a case where the rear wheelhouse 20 is connected, in different routes, to basic skeleton portions (the roof side rail 2 and the C pillar 4, for example) which are arranged above the rear wheelhouse 20.

Further, the rigidity, in the vehicle width direction, of the front flange portion 76 of the rear suspension housing reinforcement 72 is increased by the high-rigidity portion 78. Thereby, since deformation of the joint portion of the rear suspension housing reinforcement 72 to the C pillar 4 and the front suspension housing reinforcement 71 is suppressed, the load can be efficiently transmitted from the rear suspension housing reinforcement 72 to the C pillar 4 and the front suspension housing reinforcement 71. Accordingly, since the load transmitted to the rear suspension housing reinforcement 72 from the rear wheelhouse 20 can be dispersed to the C pillar 4 and the front suspension housing reinforcement 71 and toward the roof side rail 2, the upward deformation of the rear wheelhouse 20 can be further suppressed.

While the embodiment of the present invention has been described, the present invention is not to be limited to the above-described embodiment.

While the above-described embodiment described an example where the high rigidity portion 78 which is provided between the side face portion 73 and the step face portion 75 of the rear suspension housing reinforcement 72 is configured to be the triangular rib, a bead portion may be formed by a convex portion, a concave portion or the like, the thickness may be increased partially, or an additional member may be joined in a brace shape. In short, any alternative may be applied as long as the bending rigidity between the side face portion 73 and the step face portion 75 is improved. Similarly, the high-rigidity portion may be provided between the step face portion 75 and the front flange portion 77, and also the high-rigidity portion may be provided over the side face portion 73, the step face portion 75, and the front flange portion 77.

Further, while the above-described embodiment described an example where the C pillar 4 is formed by the pillar inner 60 and the pillar outer 64 and the pillar inner 60 is divided into the pillar inner upper 61 and the pillar inner lower 62, the pillar inner 60 may be formed by a single member. Moreover, the front suspension housing reinforcement 71 which is continuous to the lower side of the pillar outer 64 may be integrally formed with the pillar outer 64 as a single member, and also the suspension housing reinforcement 70 may be integrally formed with the pillar outer 64 as a single member.

Also, while the above-described embodiment described the example where the C pillar 4 is formed by the pillar inner 60 and the pillar outer 64, these member, including the front suspension housing reinforcement 71 which extends downward continuously to these member, may be referred to as the C pillar. In this case, it can be considered that the front suspension housing reinforcement 71 is integrally formed with the C pillar.

Moreover, while the above-described embodiment described the example where the rear suspension housing reinforcement 72 is continuous to the rear portions of the pillar outer 64 and the front suspension housing reinforcement 71, the rear suspension housing reinforcement 72 may be configured to be continuous to either one of the pillar outer 64 and the front suspension housing reinforcement 71.

Additionally, while the above-described embodiment described the example of the vehicle provided with three row seats, the number of the row seats of the vehicle is not limited in particular, and the present invention is applicable to a vehicle provided with a single row seat or a vehicle provided with two row seats, for example. In this case, the present invention can be materialized properly for a surrounding portion of the pillar portion (rear pillar) which extends in the vertical direction at the rear edge portion of the door opening portion which is positioned adjacently in front of the rear wheelhouse 20.

What is claimed is:

1. A side vehicle-body structure of a vehicle comprising:

a rear frame extending in a longitudinal direction at a rear lower portion of a vehicle body;

a roof side rail extending in the longitudinal direction at an upper side portion of the vehicle body;

a rear wheelhouse positioned on an outward side, in a vehicle width direction, of the rear frame and covering over a rear wheel;

a rear pillar extending downward from the roof side rail at a rear edge portion of an door opening portion which is positioned adjacently in front of the rear wheelhouse; and a suspension housing reinforcement interconnecting the rear pillar and the rear wheelhouse, wherein said rear suspension housing reinforcement has a cutout portion which is configured to extend obliquely rearward and upward at a rear lower end portion thereof, the cutout portion being not directly connected to said rear wheelhouse, and in a vehicle-body side view, a main frame which extends in the longitudinal direction is connected to a front end portion of said rear frame, a curve portion which curves rearward and upward is provided between the rear frame and said main frame, and a first imaginary line which is defined as an imaginary line which is formed by extending said cutout portion of the suspension housing reinforcement is configured to pass through said curve portion.

2. A side vehicle-body structure of a vehicle comprising:

a rear frame extending in a longitudinal direction at a rear lower portion of a vehicle body;

a roof side rail extending in the longitudinal direction at an upper side portion of the vehicle body;

a rear wheelhouse positioned on an outward side, in a vehicle width direction, of the rear frame and covering over a rear wheel;

a rear pillar extending downward from the roof side rail at a rear edge portion of an door opening portion which is positioned adjacently in front of the rear wheelhouse; and a suspension housing reinforcement interconnecting the rear pillar and the rear wheelhouse, wherein said rear suspension housing reinforcement has a cutout portion which is configured to extend obliquely rearward and upward at a rear lower end portion thereof, the cutout portion being not directly connected to said rear wheelhouse, and in a vehicle-body side view, said cutout portion of the suspension housing reinforcement is configured to be substantially perpendicular to a second imaginary line which is defined as an imaginary line which is formed by interconnecting a rear end portion of the suspension housing reinforcement and a rear lower-side portion of said rear wheelhouse.

3. A side vehicle-body structure of a vehicle comprising:

a rear frame extending in a longitudinal direction at a rear lower portion of a vehicle body;

a roof side rail extending in the longitudinal direction at an upper side portion of the vehicle body;

a rear wheelhouse positioned on an outward side, in a vehicle width direction, of the rear frame and covering over a rear wheel;

a rear pillar extending downward from the roof side rail at a rear edge portion of an door opening portion which is positioned adjacently in front of the rear wheelhouse; and a suspension housing reinforcement interconnecting the rear pillar and the rear wheelhouse, wherein said rear suspension housing reinforcement has a cutout portion which is configured to extend obliquely rearward and upward at a rear lower end portion thereof, the cutout portion being not directly connected to said rear wheelhouse, in a vehicle-body side view, a main frame which extends in the longitudinal direction is connected to a front end portion of said rear frame, a curve portion which curves rearward and upward is provided between the rear frame and said main frame, and a first imaginary line which is defined as an imaginary line which is formed by extending said cutout portion of the suspension housing reinforcement is configured to pass through said curve portion, and in a vehicle-body side view, said cutout portion of the suspension housing reinforcement is configured to be substantially perpendicular to a second imaginary line which is defined as an imaginary line which is formed by interconnecting a rear end portion of the suspension housing reinforcement and a rear lower-side portion of said rear wheelhouse.

4. The side vehicle-body structure of the vehicle of claim 1, wherein said rear wheelhouse comprises a suspension top portion to which an upper end portion of a suspension is attached, and at least a portion of said suspension housing reinforcement which overlaps said suspension top portion in a vehicle-body side view is connected to the rear wheelhouse.

5. The side vehicle-body structure of the vehicle of claim 2, wherein said rear wheelhouse comprises a suspension top portion to which an upper end portion of a suspension is attached, and at least a portion of said suspension housing reinforcement which overlaps said suspension top portion in a vehicle-body side view is connected to the rear wheelhouse.

6. The side vehicle-body structure of the vehicle of claim 3, wherein said rear wheelhouse comprises a suspension top portion to which an upper end portion of a suspension is attached, and at least a portion of said suspension housing reinforcement which overlaps said suspension top portion in a vehicle-body side view is connected to the rear wheelhouse.

* * * * *